(12) United States Patent
Tatezono et al.

(10) Patent No.: US 7,079,376 B2
(45) Date of Patent: Jul. 18, 2006

(54) ELECTRIC DOUBLE LAYER CAPACITOR, ELECTROLYTE BATTERY AND METHOD FOR MANUFACTURING THE SAME

(75) Inventors: Fumio Tatezono, Hirakata (JP); Seiji Omura, Daito (JP); Kiyotaka Ito, Daito (JP); Tsuyoshi Komatsu, Imaichi (JP); Makoto Hashimoto, Nikko (JP)

(73) Assignees: Sanyo Electric Co., Ltd., Osaka (JP); Furukawa Precision Engineering Co., Ltd., Tochigi (JP)

( * ) Notice: Subject to any disclaimer, the term of this patent is extended or adjusted under 35 U.S.C. 154(b) by 66 days.

(21) Appl. No.: 11/084,100

(22) Filed: Mar. 21, 2005

(65) Prior Publication Data

US 2005/0213284 A1    Sep. 29, 2005

(30) Foreign Application Priority Data

Mar. 23, 2004    (JP) ............................. 2004-084110

(51) Int. Cl.
  *H01G 9/00*    (2006.01)
(52) U.S. Cl. ...................... 361/502; 361/508; 361/512; 29/25.03; 29/623.1; 429/209; 429/245
(58) Field of Classification Search ................ 361/502, 361/503–504, 508, 509, 511–512, 516, 523, 361/528–529, 532; 29/25.03, 623.1; 429/223, 429/231.95, 233, 249, 209
See application file for complete search history.

(56) References Cited

U.S. PATENT DOCUMENTS

| | | | |
|---|---|---|---|
| 4,049,890 A | * | 9/1977 | Schneider .................. 429/181 |
| 4,117,212 A | * | 9/1978 | Mead et al. ................. 429/153 |
| 5,859,761 A | | 1/1999 | Aoki et al. |
| 6,364,915 B1 | | 4/2002 | Chapman-Irwin et al. |
| 6,507,479 B1 | * | 1/2003 | Saito et al. ................. 361/502 |
| 6,574,092 B1 | * | 6/2003 | Sato et al. .................. 361/502 |
| 6,811,920 B1 | * | 11/2004 | Murashige et al. ........... 429/94 |

(Continued)

FOREIGN PATENT DOCUMENTS

JP    2001-351833    12/2001

OTHER PUBLICATIONS

Patent Abstracts of Japan, vol. 2002, No. 05, May 3, 2002 & JP 2002 008955A, Jan. 11, 2002.

(Continued)

*Primary Examiner*—Anthony Dinkins

(57) ABSTRACT

An electric double layer capacitor is provided with a cell, in which a pair of polarizable electrodes, which are impregnated with an electrolyte, are disposed in opposition on either side of a separator; wherein the polarizable electrodes are provided with collector electrodes, a peripheral portion of the cell is sealed by a sealing member composed of synthetic resin, and the sealing member is formed by abutting two case halves. A manufacturing method for the capacitor includes a process step of providing at least one long slit in the collector electrodes; a step of forming the case halves formed by insert molding on the collector electrodes and filling the slit, the case halves comprising a recess, one side of which extends in the lengthwise direction of the slit and, the cell being fitted into a portion inward from the slit; and a step of joining the case halves by abutting the case halves and applying ultrasonic vibration either in a perpendicular direction or a diagonal direction with respect to the lengthwise direction of the slit.

5 Claims, 5 Drawing Sheets

U.S. PATENT DOCUMENTS

2002/0006546 A1  1/2002  Sakata et al.
2002/0106559 A1  8/2002  Takahashi et al.
2003/0030969 A1  2/2003  Farahmandi et al.
2003/0232242 A1  12/2003 Nishiyama et al.

OTHER PUBLICATIONS

Patent Abstracts of Japan, vol. 013, No. 561, Dec. 13, 1989 & JP 01 232658A, Sep. 18, 1989.

* cited by examiner

ELECTRIC DOUBLE LAYER CAPACITOR, ELECTROLYTE BATTERY AND METHOD FOR MANUFACTURING THE SAME

BACKGROUND OF THE INVENTION

1. Field of the Invention

The present invention relates to an electric double layer capacitor, an electrolyte battery, and a method for manufacturing the same.

2. Description of the Related Art

Electric double layer capacitors are devices with excellent charge-discharge behavior.

FIG. 7 is a cross-sectional view showing a cell (2) constituting a conventional electric double layer capacitor (1), as disclosed in JP 2001-351833A, for example. In it, a pair of polarizable electrodes (20) and (21) are stacked, sandwiching a separator (6), with metal collector electrodes (3) and (30) attached to outer sides of the polarizable electrodes (20) and (21). The polarizable electrodes (20) and (21) are composed by adding a conductive polymer, such as polypyrrole, to an active carbon that is in powder or fiber form, hardening this with a bonding material, and pressure forming. The polarizable electrodes (20) and (21) are impregnated with an electrolyte such as sulfuric acid. It is also possible to use a non-aqueous electrolyte as described below instead of an aqueous electrolyte such as sulfuric acid.

A peripheral portion of the polarizable electrodes (20) and (21) is sealed by an insulating sealing member (4) composed of synthetic resin, and this sealing member (4) prevents the electrolyte from leaking out of the cell (2). Ordinarily, the cell (2) comprises two or more horizontally arrayed electric double layer capacitors (1).

When charging, one collector electrode (3) is connected to a positive side of a power source, the other collector electrode (30) is connected to a negative side of a power source, and a dc voltage is applied. Negative ions are attracted to the polarizable electrode (20) connected to the positive-side collector electrode (3), while positive ions are attracted to the polarizable electrode (21) connected to the negative-side collector electrode (3), thereby forming an electric double layer between the polarizable electrodes (3) (30).

When discharging, the collector electrodes (3) and (30) are electrically connected. The electric charge accumulated in the polarizable electrodes (20) and (21) is discharged.

However, in the above-described double layer capacitor, the adhesiveness between the collector electrodes (3) and (30) and the sealing member (4) is low. Therefore, there is a possibility of the electrolyte impregnated in the polarization electrodes (20) and (21) leaking out between the collector electrodes (3) and (30) and the sealing member (4), and of moisture outside the cell (2) entering the inside of the sealing member (4). In particular, it is very common for the sealing member (4) to be formed by abutting a pair of case halves (40) and (41) together and joining them by ultrasonic welding. The electrolyte can easily leak out from between the collector electrodes (3) and (30) and the sealing member (4) during the joining due to pressure vibration caused by the ultrasonic welding.

As shown in FIG. 8, during ultrasonic welding, a horn (5) is applied from above the abutted case halves (40) and (41) and vibrated horizontally. As shown by arrow B, the vibration direction is diagonal with respect to a borderline L between the collector electrodes (3) and (30) and the sealing member (4). By doing this, a peripheral portion of the case halves (40) and (41) is welded in a uniform fashion, applying vibrations in mutually intersecting directions simultaneously within a horizontal plane. When this is done, the electrolyte moves towards the borderline L between the collector electrodes (3) and (30) and the sealing member (4), causing the electrolyte to easily leak, and allowing outside moisture to easily enter the inside of the sealing member (4).

Particularly in the case of non-aqueous electrolytes, entry of moisture from outside causes electrolysis inside the cell (2), leading to a drop in performance as an electric double layer capacitor.

The present invention has as an object to provide an electric double layer capacitor and an electrolyte battery which prevent leaking of the electrolyte and entry of moisture from outside, in particular during ultrasonic welding.

SUMMARY OF THE INVENTION

A method for manufacturing an electric double layer capacitor comprising a cell (2) in which a pair of polarizable electrodes (20) and (21), which are impregnated with an electrolyte, are disposed in opposition on either side of a separator (6); the polarizable electrodes (20) and (21) being provided with collector electrodes (3) and (30) and a peripheral portion of the cell (2) being sealed by a sealing member (4) composed of synthetic resin; and the sealing member (4) being formed by abutting two case halves (40) and (41); comprises:

a step of providing at least one long slit (31) in the collector electrodes (3) and (30);
  a step of forming the case halves (40) and (41) formed by insert molding on the collector electrodes (3) and (30) and filling the slit, the case halves (40) and (41) comprising a recess (42), one side of which extends in the lengthwise direction of the slit (31) and, the cell (2) being fitted into a portion inward from the slit (31); and
  a step of joining the case halves (40) and (41) by abutting the case halves (40) and (41) and applying ultrasonic vibration either in a perpendicular direction or a diagonal direction with respect to the lengthwise direction of the slit (31).

EFFECT OF THE INVENTION

A slit (31) is filled with the resin that constitutes a case half (40), and a side surface of the case half (40) is oriented along the lengthwise direction of the slit (31). A recess (42) into which a cell (2) is fitted is provided inwardly with respect to the slit (31). Accordingly, filling the slit (31) with resin increases adhesiveness between a collector electrode (3) and the case half (40), preventing electrolyte from leaking out of the filled slit (31) from the cell (2) disposed inside the recess (42). The possibility of moisture outside the cell (2) entering into a sealing member (4) is also prevented. The slit (31) extends along a side surface of the case half (40), and leaking and entry of moisture is prevented over the entire side surface of the case half (40).

Providing the slit (31) reduces the contact surface area between the collector electrode (3) and the first case half (40). This means that even if electrolyte does leak, there is less surface for it to travel along. This also prevents leaking of electrolyte and entry of moisture from outside.

DESCRIPTION OF THE PREFERRED EMBODIMENTS

Figure 1:
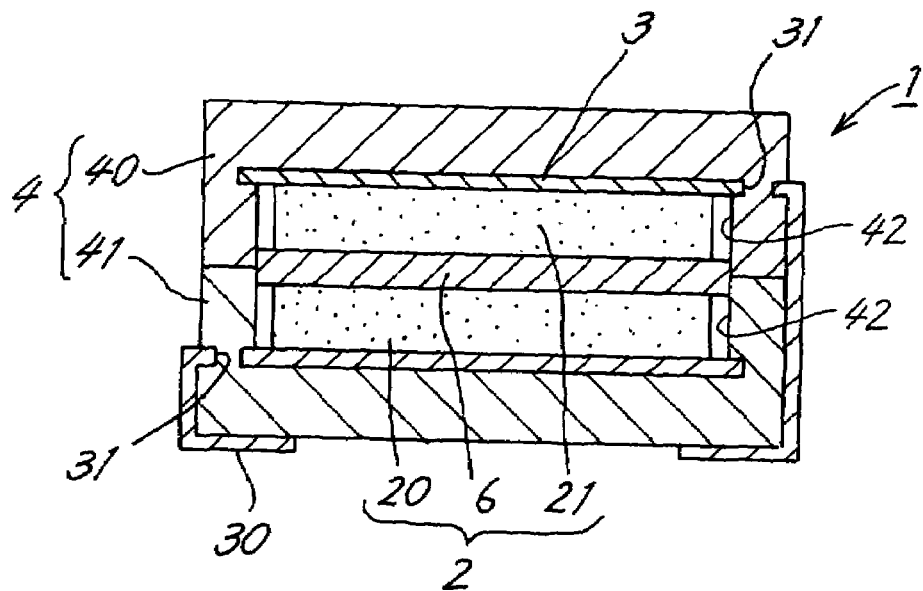
FIG. 1 is a cross-sectional view of an electric double layer capacitor.

First Embodiment for Aqueous and Non-Aqueous Electric Double Layer Capacitors FIG. 1 is a cross-sectional view of an electric double layer capacitor (1) according to the present embodiment. A cell (2) is composed, in the conventional manner, of a pair of stacked polarizable electrodes (20) and (21), which sandwich a separator (6), with collector electrodes (3) and (30), made of stainless steel or the like, attached to outer sides of the polarizable electrodes (20) and (21). In the following description, the upper polarizable electrode (21) has a negative polarity, while the lower polarizable electrode (20) has a positive polarity. Needless to say, the negative and positive poles may be reversed.

A sealing member (4) is composed by arranging a parallelepiped first case half (40) and second case half (41), whose central portions are provided with recesses (42), vertically on top of one another so that the openings of their recesses (42) abut. The polarizable electrodes (20) and (21) and the separator (6) are arranged inside the recesses (42), and the collector electrodes (3) and (30) pass through the corresponding case halves (40) and (41) and protrude to the exterior, bending along side and bottom surfaces of the case halves (40) and (41).

The first case half (40) and the second case half (41) are formed from glass, ceramic, or an insulating synthetic resin. Examples of insulating synthetic resins include modified polyamide, nylon resin, polyethyleneterephthalate, polypropylene, and polyphenylene sulfide (PPS), etc.

Besides aqueous electrolytes, such as sulfuric acid and potassium hydroxide solutions, non-aqueous electrolytes in which electrolytes such as triethylmethyl ammonium tetrafluoroborate ($Et_3MeNBF_4$) or tetraethyl ammonium tetrafluoroborate ($Et_4NBF_4$) are dissolved in an aprotic organic solvent may be used for the electrolyte with which the polarizable electrodes (20) and (21) are impregnated. Bifunctional solvents such as carbonate, lactone, nitrile, amide, nitroalkane, sulfone, sulfoxide, phosphate, dinitrile, or ether nitrile may be used as the aprotic organic solvent.

Furthermore, for the separator (6), nonwoven glass fiber fabric, paper pulp, polytetrafluoroethylene (PTFE), or other films formed from insulating resin may be used.

Figure 2:
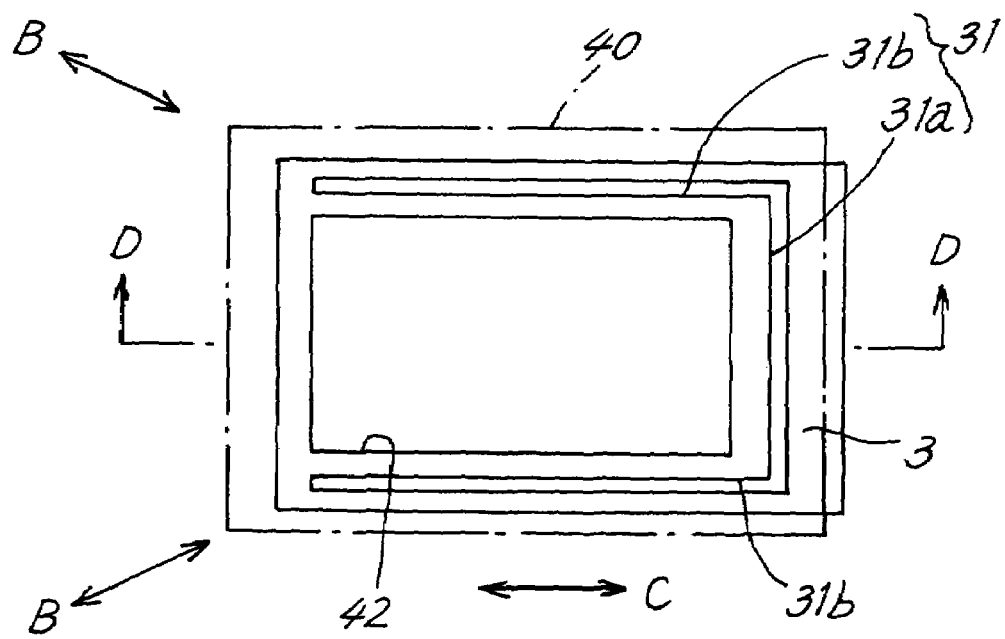
FIG. 2 is a plan view of an electric double layer capacitor.

FIG. 2 is a plan view of the negative collector electrode (3) and the first case half (40), and FIG. 1 is taken along a plane including line D—D in FIG. 2. The first case half (40) is formed by insert molding on the collector electrode (3), and a long and thin slit (31) is provided at a peripheral portion of the recess (42) of the first case half (4) on the collector electrode (3). The slit (31) comprises a first portion (31a), which extends along the side surface of the first case half (40), and second portions (31b), which are orthogonal to the first portion (31a). The first portion (31a) and the second portions (31b) are connected. A similar slit (31) is also provided in the positive collector electrode (30).

The first portion (31a) and the second portions (31b) are filled with the resin or the like that constitutes the first case half (40). Filling the slit (31) with resin increases the adhesiveness between the collector electrode (3) and the first case half (40). This prevents the electrolyte from leaking from the cell (2) located inside the recess (42) to the outside via the filled slit (31). The risk of moisture outside the cell (2) entering into the sealing member (4) is also prevented.

Providing the slit (31) reduces the contact surface area between the collector electrode (3) and the first case half (40) compared to conventional configurations. This means that even if electrolyte does leak, there is less surface area for it to travel along. This, too, prevents leaking of electrolyte and entry of moisture from outside.

In particular, the slit (31) comprises a first portion (31a), which extends along the side surface of the case halves (40) and (41), and second portions (31b), which are substantially orthogonal to the first portion (31a), and the first portion (31a) and the second portions (31b) are connected. This lengthens the route for electrolyte to leak and the route for moisture from the outside (causing both to travel around), effectively preventing leaking or entry of moisture.

Figure 3:
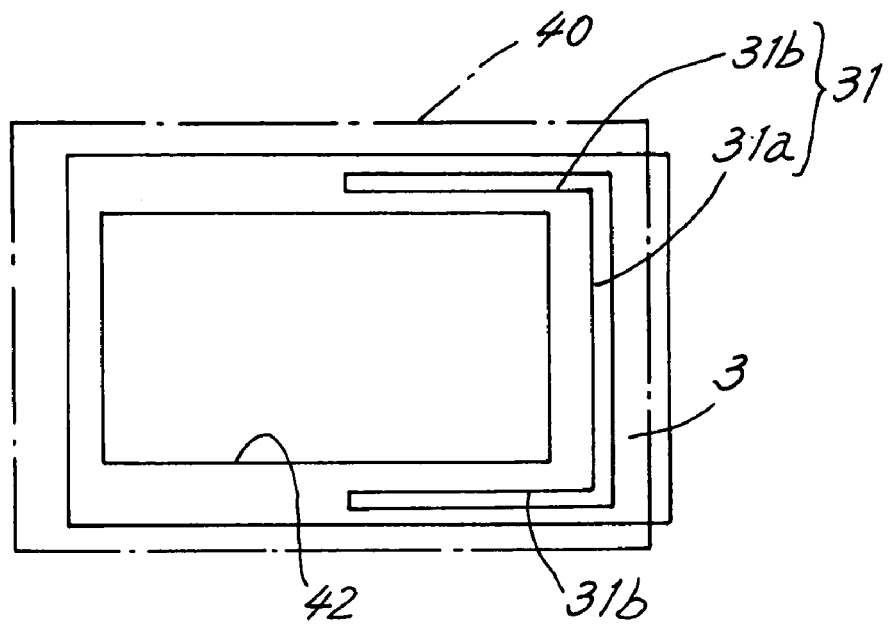
FIG. 3 is a plan view of another electric double layer capacitor.

The second portions (31b) of the slit (31) do not have to extend along the entire length of the lengthwise direction of the recess (42), but rather as shown in FIG. 3, may extend as far as a central portion in the lengthwise direction of the recess (42).

Figure 4:
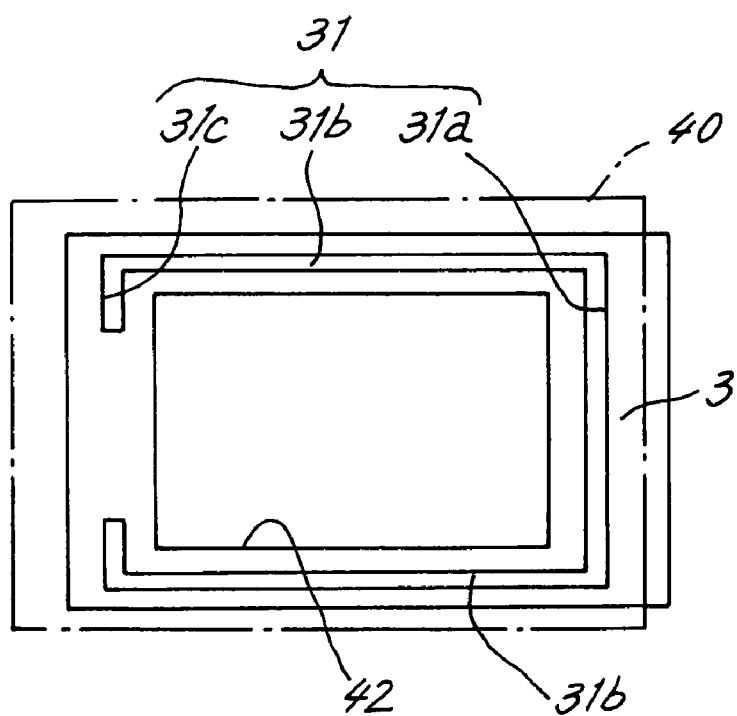
FIG. 4 is a plan view of another electric double layer capacitor.

Moreover, as shown in FIG. 4, it is also possible to provide third portions (31c) orthogonal to the second portions (31b) and extending inwardly from end portions of the second portions (31b). The first portion (31a), the second portions (31b), and the third portions (31c) are connected.

Manufacturing Method for an Electric Double Layer Capacitor

Figure 5:
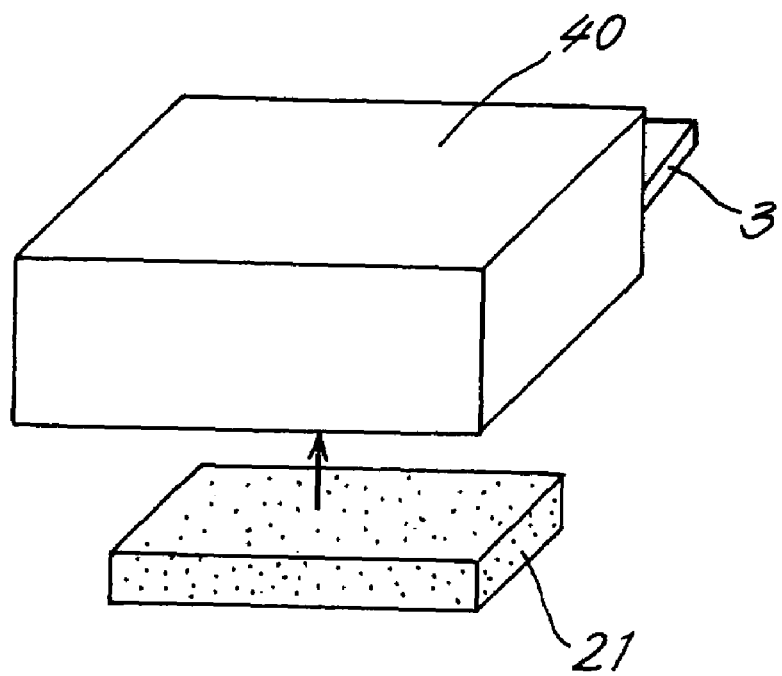
FIG. 5 is an exploded oblique view showing a manufacturing process for an electric double layer capacitor.
Figure 5:
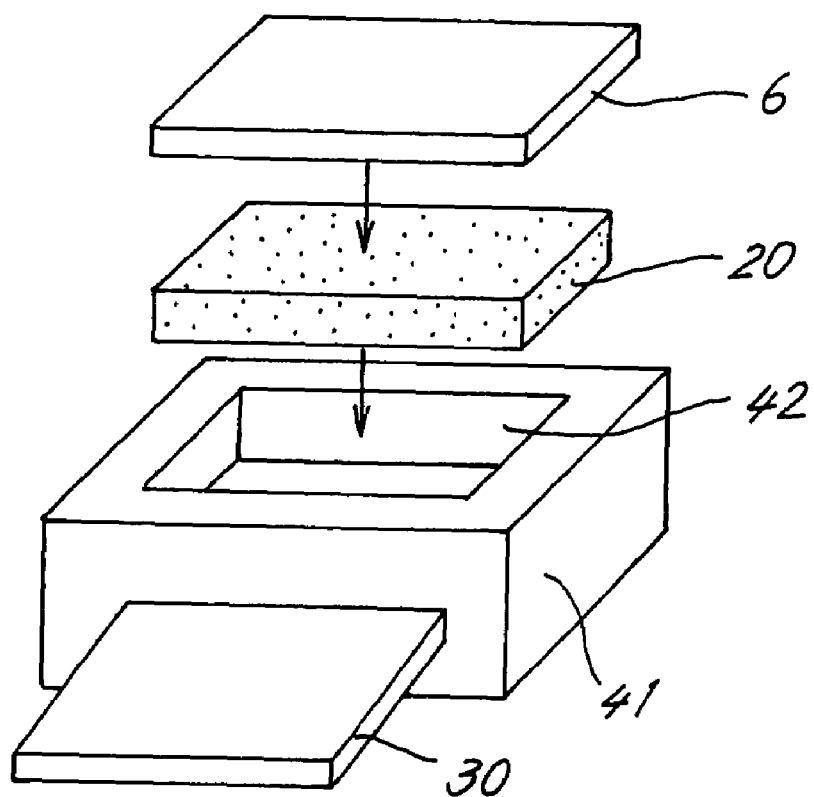

The cell (2) of the electric double layer capacitor (1) is configured as shown in FIG. 5. A first case half (40) is formed through insert molding into a negative collector electrode (3). The opening of the recess (not shown) in the first case half (40) is oriented facing down. Similarly, a second case half (41) is formed through insert molding into a positive collector electrode (30), with the opening of the recess (42) in the second case half (41) oriented facing up.

A pair of polarizable electrodes (20) and (21) is arranged, sandwiching a separator (6), inside the recesses (42) in the case halves (40) and (41). The separator (6) and the polarizable electrodes (20) and (21) are impregnated in advance with an electrolyte through vacuum filling.

Figure 8:
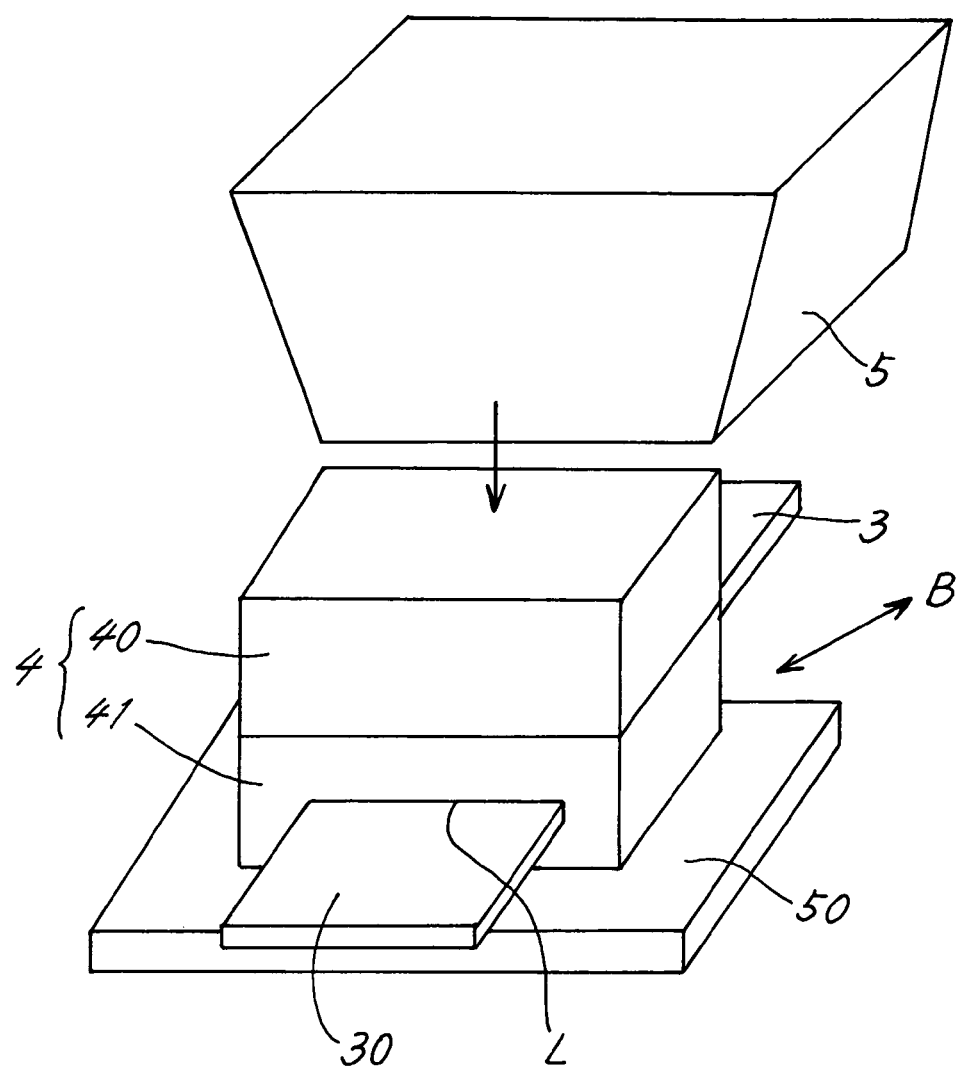
FIG. 8 is an oblique view showing ultrasonic welding.

As shown in FIG. 8, the case halves (40) and (41) are abutted and placed on a base (50). A horn (5) is applied to the first case half (40) from above the upper case half (40). The horn (5) is used to apply horizontal pressure vibration to the case halves (40) and (41), and peripheral portions of the case halves (40) and (41) are joined using ultrasonic welding, etc. As shown by arrow B in FIG. 2, the vibration direction is diagonal with respect to the first portion (31a) of the slit (31). By doing this, the peripheral portion of the case halves (40) and (41) is welded in a uniform fashion, applying vibrations in mutually intersecting directions simultaneously (one direction parallel to the first portion (31a) and another direction perpendicular to it) within a horizontal plane. When this is done, the electrolyte moves towards the borderline L between the collector electrodes (3) and (30)

and the case halves (40) and (41). However, according to the present embodiment, as described above, the adhesiveness between the collector electrodes (3) and (30) and the first and second case halves (40) and (41) is increased, so the risk of electrolyte leaking from the borderline L or moisture entering through the borderline L is effectively prevented. The first portion (31$a$) of the slit (31) extends along the side surfaces of the first and second case halves (40) and (41), and leaking and entry of moisture are prevented over the entire side surface of the first and second case halves (40) and (41).

Moreover, even if the case halves (40) and (41) are welded by vibrating perpendicularly with respect to the first portion (31$a$) of the slit (31) as shown by arrow C in FIG. 2, leaking of electrolyte and entry of moisture from outside are prevented.

After the peripheral portions of the case halves (40) and (41) are welded, the collector electrodes (3) and (30) are bent downwards along the peripheral surface of the case halves (40) and (41), completing the electric double layer capacitor (1) shown in FIG. 1.

Experimental Results

The applicant made 10 units of the electric double layer capacitor (1) using stainless steel collector electrodes (3) and (30) in which the slit (31) was provided. The applicant further made 10 units of the electric double layer capacitor (1) using stainless steel collector electrodes (3) and (30) in which no slit (31) was provided. In all cases, the first and second case halves (40) and (41) were made of PPS. These electric double layer capacitors (1) were left at room temperature and checked to see how many of the electric double layer capacitors (1) leaked electrolyte after 24 and 72 hours. The findings are shown in Table 1 below.

TABLE 1

|  | With slit | Without slit |
| --- | --- | --- |
| No. of units leaking electrolyte after 24 hours | 0/10 units | 0/10 units |
| No. of units leaking electrolyte after 72 hours | 0/10 units | 1/10 units |

The above findings confirm the ability of the slit (31) to prevent leaking of the electrolyte.

Second Embodiment

Figure 6:
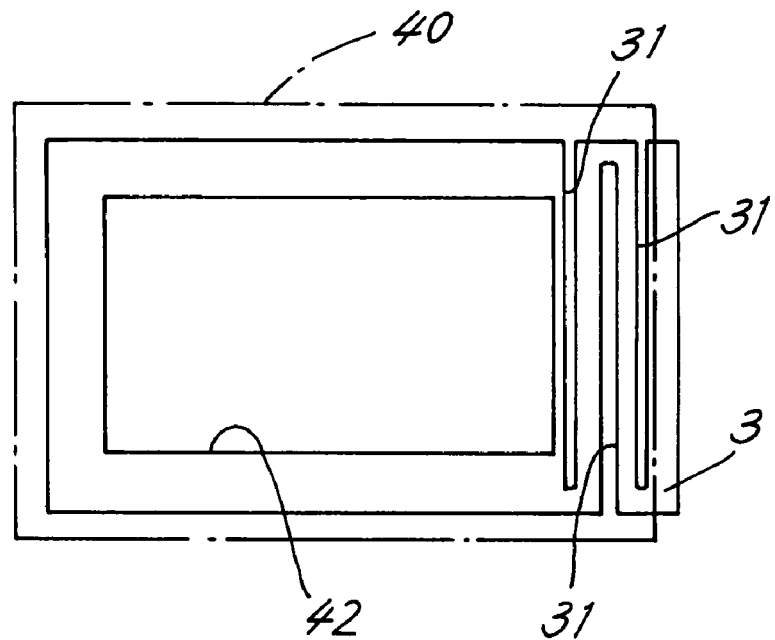
FIG. 6 is a plan view of another electric double layer capacitor.
Figure 7:
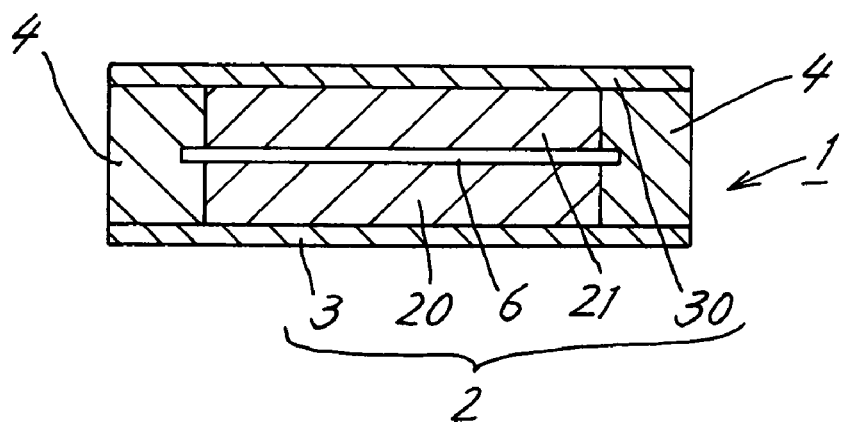
FIG. 7 is a cross-sectional view of a conventional electric double layer capacitor.

The configuration shown in FIG. 6 is also possible in order to effectively prevent leaking of electrolyte and entry of moisture from outside a cell (2). A plurality of slits (31) and (31) is provided substantially in parallel between a side surface of a first case half (40) and a recess (42), and each slit (31) extends along the side surface of the first case half (40).

Providing this plurality of slits (31) and (31) further increases the adhesiveness between the collector electrodes (3) and (30) and the first and second case halves (40) and (41). Accordingly, leaking of an electrolyte from a borderline L and entry of moisture from the borderline L are effectively prevented.

Electrolyte Battery

The present invention can also be applied to aqueous and non-aqueous electrolyte batteries.

An electrolyte battery differs from the electric double layer capacitor only in that some of the component materials are different, while the design and manufacturing method are substantively the same.

In the case of a non-aqueous electrolyte battery, the polarizable electrodes of the electric double layer capacitor are replaced with a positive active material body and a negative active material body. For the positive active material body, there are lithium cobaltate, lithium manganate, lithium nickelate, and other materials achieved through pressure forming or sintering of a powder, and for the negative active material body, there are graphite-based carbon materials, coke-based carbon materials, and other materials achieved through pressure forming or sintering of a powder.

Organic solvents in which a lithium salt has been dissolved are used for the electrolyte. Examples of lithium salts include $LiBF_4$, $LiClO_4$, $LiPF_6$, $LiAsF_6$, $Li(CF_3O_2)_2N$, and $LiC_4F_9SO_3$, while organic solvents include propylene carbonate and gamma butyrolactone or a mixture of either of these and a chain carbonate. Examples of chain carbonates include dimethyl carbonate (DMC, DEC) and ethyl methyl carbonate (EMC).

For the separator, a porous polymer film of polyophyllene, polyethylene, polypropylene, or the like may be used.

In the case of aqueous electrolytic batteries such as a lithium ion batteries, there are materials achieved by sintering or compression molding of nickel oxide powder or pellets for the positive active material, and materials achieved by sintering or compression molding of powder or pellets of Mm—Ni—Co—Mn—Al-based hydrogen storing alloys (Mm being a mixture of rare earth elements) for the negative active material.

A potassium hydroxide solution or a polymer hydrogel electrolyte solution can be used for the electrolyte. For the separator, a porous polymer film of sulfonated polypropylene or the like can be used.

Figure 9:
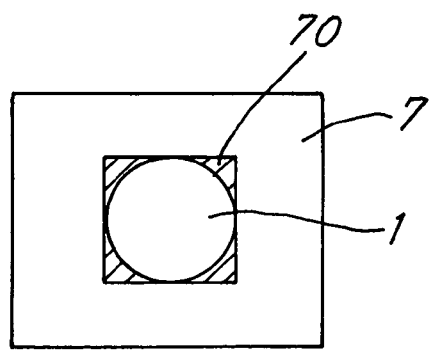
FIG. 9 is a plan view showing an electric double layer capacitor mounted on a circuit board.

Electric double layer capacitors (1) and electrolyte batteries are generally rectangular parallelipipeds or columnar in shape. However, as shown in FIG. 9, in the case of a columnar shape, dead space (70) is created when mounting on a circuit board (7), so a rectangular solid is preferable in order to make effective use of the surface area on the circuit board (7).

What is claimed is:

1. A method for manufacturing an electric double layer capacitor, comprising:
   a cell in which a pair of polarizable electrodes, which are impregnated with an electrolyte, are disposed in opposition on either side of a separator the polarizable electrodes being provided with collector electrodes and a peripheral portion of the cell being sealed by a sealing member composed of synthetic resin; and the sealing member being formed by abutting two case halves; the method comprising:
   a step of providing at least one long slit in the collector electrodes;
   a step of forming the case halves formed by insert molding on the collector electrodes and filling the slit, the case halves comprising a recess, one side of which extends in the lengthwise direction of the slit and, the cell being fitted into a portion inward from the slit; and
   a step of joining the case halves by abutting the case halves and applying ultrasonic vibration either in a perpendicular direction or a diagonal direction with respect to the lengthwise direction of the slit.

2. A method for manufacturing an electrolyte battery, comprising a cell in which a pair of active material bodies, which are impregnated with an electrolyte, are disposed in opposition on either side of a separator; the active material bodies being provided with collector electrodes, a peripheral portion of the cell being sealed by a sealing member composed of synthetic resin; and the sealing member being formed by abutting two case halves; the method comprising:
- a process step of providing at least one long slit in the collector electrodes;
- a process step which is a process step of forming the case halves formed by insert molding on the collector electrodes and filling the slit, the case halves comprising a recess, one side of which extends in the lengthwise direction of the slit and, the cell being fitted into a portion inward from the slit; and
- a step of joining the case halves by abutting the case halves and applying ultrasonic vibration either in a perpendicular direction or a diagonal direction with respect to the lengthwise direction of the slit.

3. An electric double layer capacitor, comprising:
a cell in which a pair of polarizable electrodes, which are impregnated with an electrolyte, are disposed in opposition on either side of a separator;
wherein the polarizable electrodes are provided with collector electrodes and a peripheral portion of the cell is sealed by a sealing member composed of synthetic resin;
wherein the sealing member is formed by abutting two case halves;
wherein the case halves are each provided with a recess into which the cell is fitted; and
wherein a slit filled with the resin constituting the sealing member is provided in opposition to a peripheral portion of the recess in each of the collector electrodes.

4. The electric double layer capacitor according to claim 3, wherein:
the slit comprises a first portion, which extends along the side surface of the case halves, and second portions, which are substantially orthogonal to the first portion, and the first portion and the second portions are connected.

5. An electrolyte battery, comprising:
a cell in which a pair of active material bodies, which are impregnated with an electrolyte, are disposed in opposition on either side of a separator;
wherein the active material bodies are provided with collector electrodes and a peripheral portion of the cell is sealed by a sealing member composed of synthetic resin;
wherein the sealing member is formed by abutting two case halves;
wherein the case halves are each provided with a recess into which the cell is fitted; and
wherein a slit filled with the resin constituting the sealing member is provided in opposition to a peripheral portion of the recess in each of the collector electrodes.

* * * * *